April 1, 1952 M. E. WALSH 2,591,391
FISHING LURE
Filed Feb. 13, 1950
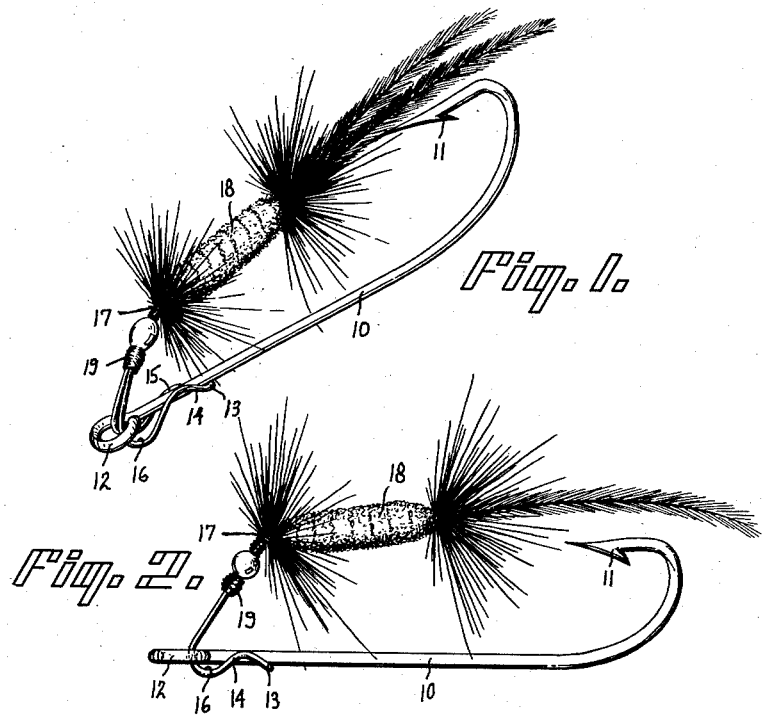
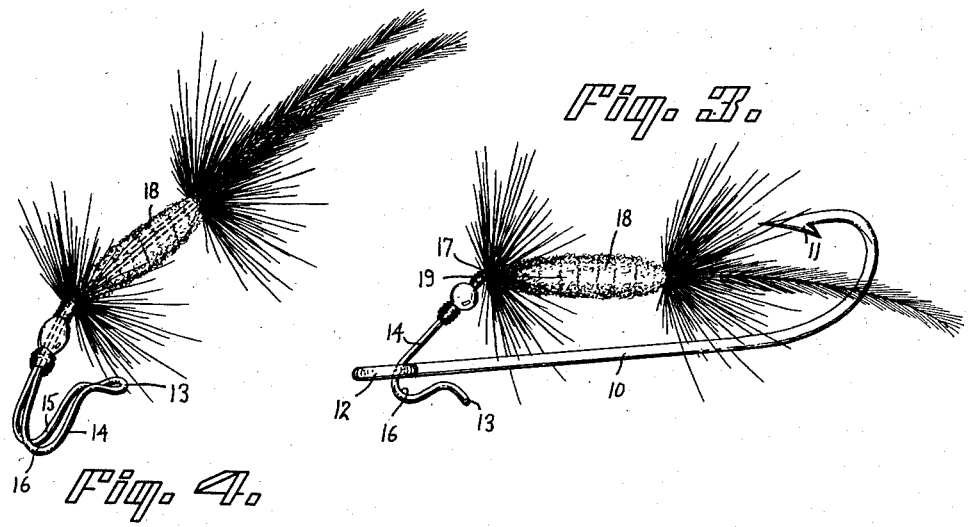
Inventor
Michael E. Walsh Patented Apr. 1, 1952

2,591,391

UNITED STATES PATENT OFFICE 2,591,391

FISHING LURE

Michael E. Walsh, Des Moines, Iowa

Application February 13, 1950, Serial No. 143,999

2 Claims. (Cl. 43—43.6)

My invention relates to a novel means for supporting an artificial or natural lure that is used in combination with a fishing hook, and more particularly for supporting such a lure on a hook when used in that phase of the fishing sport known as fly fishing.

In the sport of fly fishing the fisherman will very frequently change the fly lure on the end of his line. This may be because it has become too wet or for any one of countless other reasons as the whims and fancy of the sportsman dictates. Artificial fly lures are made in various colors and combination of colors and the reasons for the choice of a particular fly under varying circumstances contribute to the enjoyment of this particular sport. Heretofore each separate fly lure has been securely affixed to a fishing hook so that if a different fly was desired, the hook itself was removed from the line and replaced with another hook having another fly of the type and color selected. In my invention I have eliminated the need for a separate fishing hook for each different fly lure.

It is therefore an object of my invention to provide a resilient spring clip upon which a fly lure can be secured and which clip can easily and quickly be attached to or detached from a fishing hook.

A further object of this invention is to provide a clip of the above class that is capable of yieldingly holding a fly lure in such a position that it normally obscures the barbed end of the fishing hook but which will move when the lure is taken by the fish to expose the barb and thereby not interfere with the catch being hooked.

A still further object of this invention is to provide a clip attaching means of the character described that may be used on fishing hooks of different sizes without requiring any adjustment.

A still further object of this invention is to provide a detachable fly lure supporting means for fishing hooks that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of a fly lure shown arranged on a fishing hook by means of my spring clip, Fig. 2 is a side view of the lure, clip and hook shown in Fig. 1, Fig. 3 is a perspective view of a fly lure shown mounted on my spring clip, and Fig. 4 is a side view similar to that in Fig. 2 but showing the spring clip disengaged from the shank of the fishing hook.

Referring to the drawings I have used the numeral 10 to designate the shank of any fishing hook having a barb 11 on one end and an eye 12 on the other end. It is for use with this usual type of fishing hook that my invention is more particularly adapted. The novelty of my invention resides in a resilient spring clip that can be detachably secured to the fishing hook and to which there may be secured an artificial or natural lure and especially a fly lure as used in fly fishing. This new clip I make from a single strand length of spring wire or the like that is bent at its center to form the U-portion 13. The resulting two arm lengths 14 and 15, as shown in Fig. 4, are then first bent downwardly and rearwardly, then into an enlarged U portion 16 where they continue upwardly to the bend point 17. From the bend point 17 the arms 14 and 15 extend forwardly and slightly downwardly, as can be more clearly seen in Figs. 2 and 3. The lure 18 is mounted on those portions of the arms 14 and 15 that are forwardly of the bend point 17. No claim is made here to any particular lure for they may be as varied and colorful as the fancy of the sportsman requires. The lure illustrated in the drawings is of the type generally used for fly fishing. When the lure 18 is secured to the free end portions of the arms 14 and 15 by any suitable means such as the thread 19, the arms will be adjacent each other at and forwardly of the bend point 17. However, at the large U portion 16 they will be in spaced relation and near the smaller U portion 13 they are in still closer spaced relation and capable of yieldingly engaging the shank 10 as shown in Figs. 1 and 2.

With the fishing hook in a position as shown in the drawings, this clip is detachably secured thereto by first passing the small U portion 13 down through the eye 12. This can more easily be accomplished if the tail end of the lure is pointing in most any direction except directly towards the barb 11. The lure is then turned so that its tail end is pointing towards the barb 11 and the U portion 13 is directly under the shank 10 as shown in Fig. 3. In this position a slightly upwardly manual pressure will cause the arms 14 and 15 to yieldingly engage the shank as shown in Fig. 2. Thus arranged, the lure 18 will be supported on substantially the same plane as the barb 11 and will tend to obscure it, as shown in Fig. 1. However, any pressure on the lure such as that caused by a fish taking it will cause the lure to yieldingly move out of alignment with the barb so it will not interfere with the catch being hooked. To remove the lure and clip, the procedure above described for attaching it is merely reversed. Thus, by the use of this invention, this type of lure can be replaced without the necessity for changing the hook. Another advantage lies in the fact that the lure need not initially be secured to a barbed hook. Many sportsmen prefer to make at least some of their own lures and in placing them on my clips the danger of getting torn or pierced fingers due to handling the barbed hooks is obviously eliminated. While I show an artificial lure in the drawings, it is apparent that a natural lure such as a minnow or the like could be arranged on this clip, if desired.

At times, a fisherman will use fishing hooks of different sizes and it has been found that this clip can be used on most all of them because of the resiliency of the arms at the U portion 13. Also, in actual use, this lure when in the water will maintain the position substantially as shown in Fig. 2. This results from the lure itself acting as a float and the shank of the hook performing in much the same fashion as the keel of a ship.

Some changes may be made in the construction and arrangement of my fishing lure without departing from the real spirit and purpose of my invention, and it is my intention to cover by my claims, any modified forms of structure or use of mechanical equivalents which may be reasonably included within their scope.

I claim:

1. In combination, a spring clip, comprising, a strand length of resilient wire first bent at its center portion into a U-portion, the resulting two arm portions then bent downwardly and rearwardly, then bent into a second U-portion and continuing to a bend point, then forwardly together and adjacent each other, and a fishing fly lure secured to the free end portions of said arms that are together and adjacent; said clip designed so that said first U-portion is capable of being passed through the eye of a fishing hook and the two arm portions of said clip are capable of yieldingly engaging the shank of the fishing hook so that said lure is yieldingly extended toward the barbed point on the hook and in substantially the same longitudinal plane as the barbed point of the hook so as to obscure the barbed point.

2. In combination, a fishing hook having an eye, a shank and a barbed point, a spring clip, comprising, a strand length of resilient wire first bent at its center portion into a U-portion, the resulting two arm portions then bent downwardly and rearwardly, then bent into a second U-portion and continuing until the two arm portions are together and adjacent each other, and a fishing fly lure secured to the free end portions of said arms that are together and adjacent each other; said clip detachably secured to said hook in a manner whereby the first U-portion passes through said eye and the two arm portions resulting from said U-portion yieldingly engaging said shank so that said lure is yieldingly supported to extend toward said barbed point in substantially the same longitudinal plane as the barbed point for obscuring said barbed point; said shaft of said fishing hook being of such weight relative to said lure that it will act as a keel, thereby holding said lure and said barbed point upwardly when the device is drawn through the water.

MICHAEL E. WALSH.

REFERENCES CITED

The following references are of record in the file of this patent:

UNITED STATES PATENTS

| Number | Name | Date |
|---|---|---|
| 847,266 | Upton | Mar. 12, 1907 |
| 1,547,619 | Shannon | July 28, 1925 |
| 1,554,940 | Young | Sept. 22, 1925 |
| 2,160,347 | Walsh | May 30, 1939 |
| 2,402,853 | Sweeney | June 25, 1946 |
| 2,427,267 | Fiskaali | Sept. 9, 1947 |